CONTOURING FUNCTION GENERATOR

TOOL RADIUS FUNCTION GENERATOR

United States Patent Office 3,449,554
Patented June 10, 1969

3,449,554
OFFSET COMPENSATION FOR
NUMERICAL CONTROLS
Leroy U. C. Kelling, Waynesboro, Va., assignor to General Electric Company, a corporation of New York
Continuation of application Ser. No. 350,370, Mar. 9, 1964. This application Aug. 28, 1967, Ser. No. 668,986
Int. Cl. G06f 15/46; G06g 7/46
U.S. Cl. 235—151.11          22 Claims

ABSTRACT OF THE DISCLOSURE

An arrangement for adjustably and automatically maintaining a machine element at a predetermined distance with respect to a commanded path of relative motion between a machining element and a material to be machined. A compensating function generator continuously modifies the component axial commands being generated by a contouring function generator to provide the compensated control action.

---

This application is a continuation of my co-pending application Ser. No. 350,370 filed Mar. 9, 1964, now abandoned.

The invention relates to a compensating circuit for numerical contouring controls, and particularly to such a compensating circuit for maintaining a machining tool or cutter at a predetermined distance from a commanded path of relative motion of the cutter and a workpiece.

Numerical contouring controls are used to shape or contour a workpiece by controlling the relative movement of the workpiece and a tool such as a rotating milling cutter. The numerical contouring control causes this relative movement to follow a commanded path which is numerically indicated in some storage medium. As the relative movement takes place, the workpiece is contoured or shaped as a function of the commanded path. Preparation of the storage medium requires calculations, and these calculations are expensive and time-consuming. If the control can compensate for the cutter radius, then these calculations can be simplified by the use of a commanded path which is coincident with the desired contour of the finished workpiece. Normally, the calculations are made on the basis that the commanded path is at some fixed distance (usually equal to a nominal dimension or radius of the cutter to be used) from the desired contour of the finished workpiece. However, if a cutter of a different size is used, the workpiece will have an improper final size. Or, if the nominally proper size of the cutter has been reduced by sharpening, the finished workpiece will be oversized in all contoured directions by the reduction in tool size.

Therefore, an object of the invention is to provide a numerical contouring control which can compensate for tool sizes, or for differences in tool sizes.

Another object of the invention is to provide a numerical control with means for changing a commanded path of relative motion by a predetermined distance in the desired perpendicular direction with respect to the commanded path.

Another object of the invention is to provide a numerical control or a numerical contouring control with a circuit that causes the control to produce work which is undersized or oversized by a predetermined amount relative to a commanded or programmed size.

Another object of the invention is to provide a compensating circuit for a numerical contouring control that permits the initial commanded path of motion to coincide with the finished workpiece contour, and that changes the commanded path of motion by an amount dependent upon the size of the tool to be used.

Another object of the invention is to provide a compensating circuit for a numerical contouring control that permits a nominal tool size to be used in determining the commanded path of motion, and that changes the commanded path of motion by an amount dependent upon the difference between the nominal tool size and the actual tool size to be used.

Many numerical contouring controls now use digital techniques in which trains of pulses provide part of the necessary control by their rate and time of occurrence. Therefore, another object of the invention is to provide an improved numerical contouring control which uses digital techniques for compensating for tool sizes or for differences in tool sizes.

Another object of the invention is to provide an improved tool size compensating circuit that uses digital techniques.

The invention is intended to be used with a numerical contouring control for producing relative motion of a tool and a workpiece along a path that comprises interconnected straight lines and circular arcs which have a common tangent at their points of connection. Means are provided for commanding the speed of the relative motion of the tool and workpiece, and for commanding the direction of the path of relative motion of the tool and workpiece. A velocity command produces a train of contouring velocity pulses at a rate indicative of the commanded speed of relative motion. A contouring function generator resolves these contouring velocity pulses into two components of pulses having respective rates indicative of the commanded path direction with respect to two mutually perpendicular axes. In accordance with the invention, means are provided for commanding a compensating distance and direction relative to the commanded path. A compensating function generator resolves the contouring velocity pulses into two components of pulses having respective rates indicative of the commanded compensating distance and direction with respect to the two perpendicular axes. The contouring function generator and the compensating function generator are both set in initial and similar conditions relative to one of the two perpendicaular axes. Then, as the contouring function generator changes path direction, the compensating function generator changes path direction in a similar manner. This change is along circular arcs having a common center. Means are coupled to both function generators for combining the components of pulses relative to one of the perpendicular axes and for combining the components of pulses relative to the other of the perpendicular axes. The respective combined components of pulses are then used to effect compensated relative motion of the machine tool and workpiece along the two perpendicular axes.

The invention is particularly pointed out in the claims. The invention may be better understood from the following description given in connection with the accompanying drawing, in which:

FIGURE 3A shows a vector diagram useful in explaining compensation involving a reverse curve path;

In the specification, a description will first be given of a numerical contouring control system and its contouring function generator. Then, a description will be given of the compensating circuit, its compensating function generator, and the combining logic circuits in accordance with the invention.

NUMERICAL CONTOURING CONTROL SYSTEM

Figure 1:
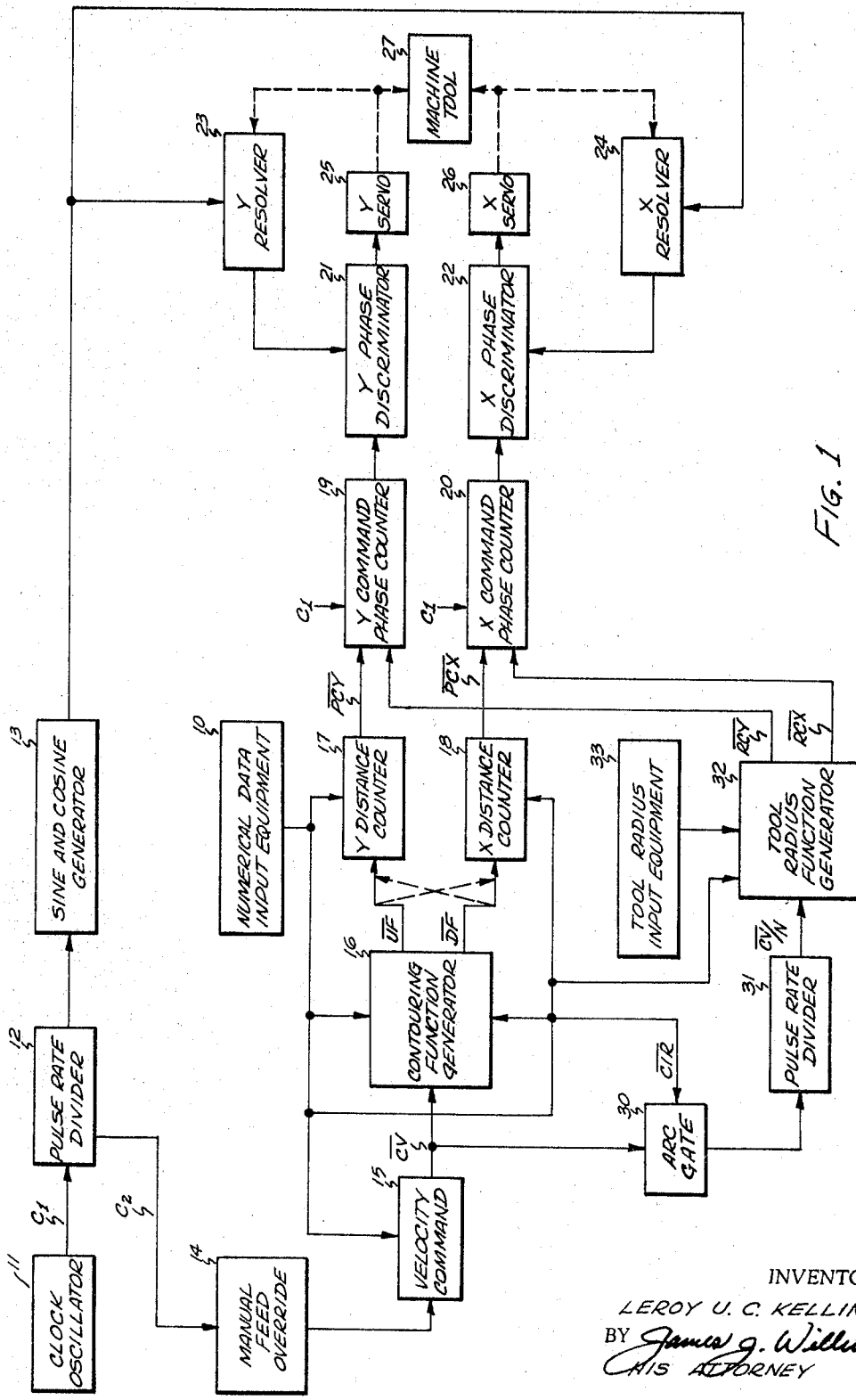
FIGURE 1 shows a block diagram of a numerical contouring control system and the compensating circuit of the invention.

FIGURE 1 shows a block diagram of a numerical contouring control system and the compensating circuit of the invention. The numerical contouring control system shown in FIGURE 1 is known in the art. The system has been assumed to provide an X axis of motion and a Y axis of motion, these axes usually being mutually perpendicular, and generally lying in a plane. However, more or less axes of motion may be provided. The combined axes of motion provide the resultant motion. The system is provided with numerical command information from numerical data input equipment 10. This information may be on a punched tape, a punched card, a magnetic tape, or on some other medium. Typically, this information indicates the desired speed of relative movement of a tool (such as a milling machine cutter) and a workpiece, and the desired direction of the path of relative movement of the tool and workpiece. The numerical data input equipment 10 reads the commanded information and generates appropriate electrical signals for controlling the system and relative movement of the tool and workpiece. The system utilizes pulses or trains of pulses which convey or indicate the commanded information, and which are usually square-wave pulses which vary between logic 0 and logic 1. These pulses are produced by a pulse timing generator or clock oscillator 11 at a C1 rate which typically is 250 kilocycles. This C1 rate is divided or reduced by a pulse rate divider 12 which produces pulses at various rates including the C2 rate indicated. In the following descriptions, the suffix numeral on the rate indicates the fractional portion of the basic C1 rate. Thus pulses at the C2 rate would have a rate or frequency of one-half the C1 rate, or 125 kilocycles. The pulse rate divider 12 also supplies 250 cycle pulses to a sine and cosine generator 13 which produces 250 cycle sine and cosine signals for use in the servo portion of the system.

Pulses from the pulse rate divider 12 are supplied to a manual feed override 14 which enables an operator to manually control the speed of relative movement. Pulses from the manual feed override 14 are supplied to a velocity command 15 which modifies the incoming pulse rate from the manual feed override 14 by an amount called for by the numerical data input equipment 10, and provides contouring velocity pulses $\overline{CV}$. These contouring velocity pulses $\overline{CV}$ occur at a rate which indicates the resultant velocity of relative motion of the tool and workpiece.

The contouring velocity pulses $\overline{CV}$ are supplied to a contouring function generator 16 which resolves these pulses into X and Y components of pulses which have rates respectively indicative of the velocity of motion to be provided along the X and Y axes. These components of pulses are indicated as $\overline{UF}$ and $\overline{DF}$ and are applied to Y and X distance counters 17, 18. As indicated by the dashed lines, the $\overline{UF}$ pulses and $\overline{DF}$ pulses can be respectively applied to Y and X distance counters 17, 18 or to X and Y distance counters 18, 17. This provision is made so that the contouring function generator 16 need operate in only one quadrant, that is through an angle of 90 degrees. If additional quadrants of motion are desired, input information from the numerical data input equipment 10 is supplied to the contouring function generator 16 and to the distance counters 17, 18 to effectively shift the function generator quadrant of operation to another quadrant. Thus motion in all four quadrants (through an angle of 360 degrees) can be provided. Information is supplied to the distance counters 17, 18 to limit the distance traveled in a given operation to some predetermined absolute point so that errors do not accumulate. Thus, after the predetermined number of $\overline{UF}$ or $\overline{DF}$ pulses have passed through the respective distance counters, the distance counters prevent further pulses from passing and stop motion along their respective axes.

Pulses passed by the Y and X distance counters 17, 18 are indicated as $\overline{PCY}$ and $\overline{PCX}$ pulses, these pulses having the same rate as the respective $\overline{UF}$ and $\overline{DF}$ pulses. The $\overline{PCY}$ and $\overline{PCX}$ pulses are respectively applied to Y and X command phase counters 19, 20. These counters 19, 20 convert the applied pulses to respective signals each having a significant phase or time occurrence, and supply these phase significant signals to respective Y and X phase discriminators 21, 22.

The phase discriminators 21, 22 compare the phases of signals from the respective Y and X phase counters 19, 20 with the phases of signals from the Y and X resolvers 23, 24, and produce control signals which are applied to Y and X servos 25, 26. These servos 25, 26 effect motion of a machine tool 27 in the Y and X direction as indicated by the dashed lines. These Y and X servos 25, 26 also move or operate the Y and X resolvers 23, 24. As these resolvers 23, 24 move, the respective phases of their output signals shift. As long as a difference in phase exists between the two signals supplied to a phase discriminator, motion is called for. This motion moves the machine tool and the resolvers. If the system is operating properly, no further motion signals are produced after the time that the machine tool reaches its commanded or desired position.

Figure 2:
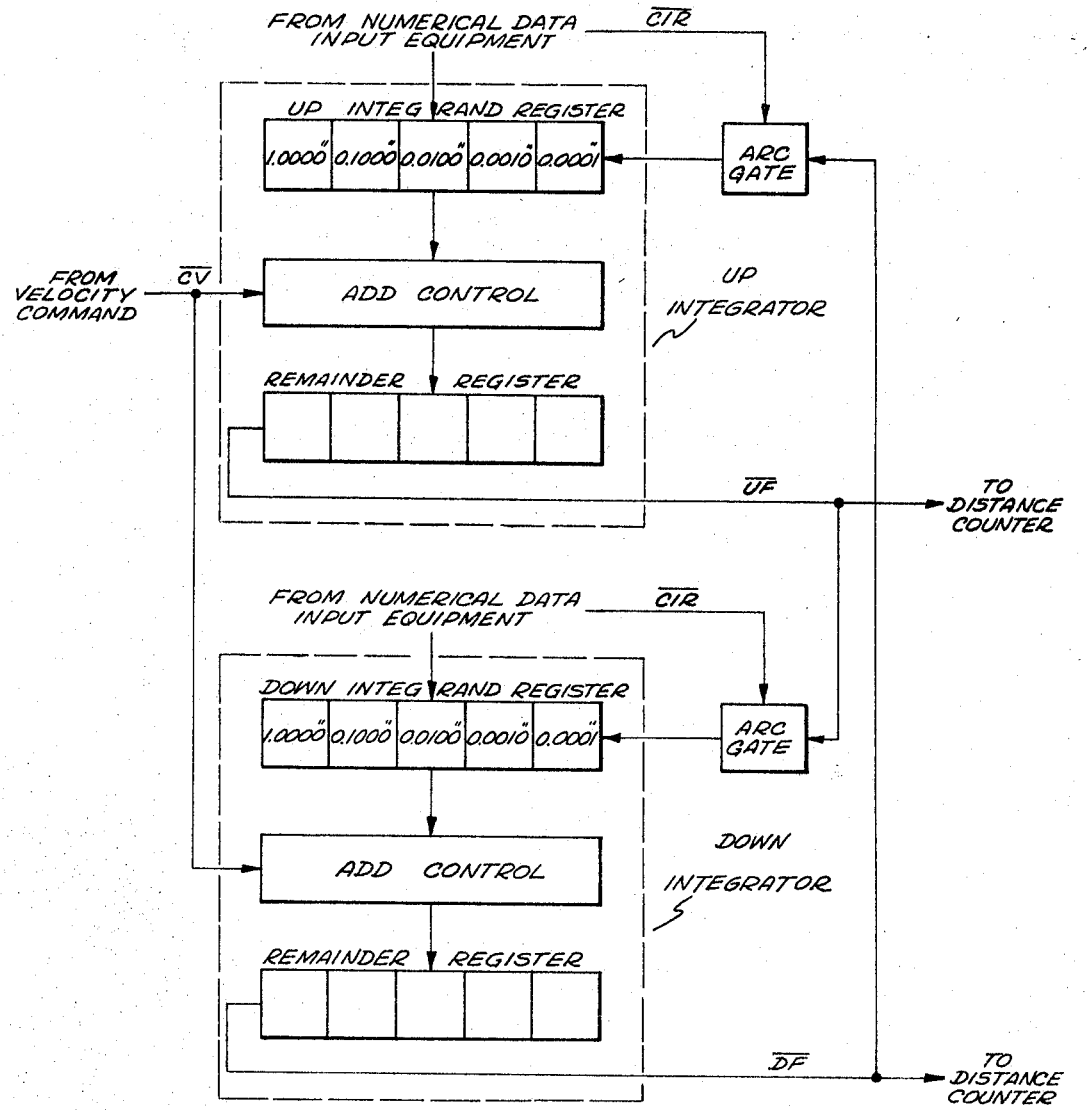
FIGURE 2 shows a more detailed block diagram of the contouring function generator used with the numerical contouring control system shown in FIGURE 1.

FIGURE 2 shows a more detailed block diagram of the contouring function generator 16 shown in FIGURE 1. This function generator is of the known digital differential analyzer type, and resolves the contouring velocity pulses $\overline{CV}$ into two components of pulses $\overline{UF}$ and $\overline{DF}$ having rates representative of the desired motion velocities along the X and Y axes. The function generator comprises up and down integrators which are respectively shown enclosed in dashed lines. The up and down integrators are similar, and each comprises an integrand register having five decade counter units. One integrand register counts upscale and the other integrand register counts downscale. It has been assumed that the system shown in FIGURE 1 and the function generator shown in FIGURE 2 can contour up to 9.9999 inches with a resolution of 0.0001 inch. Therefore, one contouring velocity pulse $\overline{CV}$ may produce resultant motion of 0.0001 inch, and the integrand register decades have the dimensional significances shown. Input information which indicates the distance to be traveled (or the arc center offsets of the starting point of an arc) is supplied to each integrand register from the numerical data input equipment. The integrand registers are each coupled to a respective add control circuit. Each of the add control circuits is operated or triggered by contouring velocity pulses $\overline{CV}$, and when so operated adds the number in its respective integrand register to the number in its respective remainder register. Each of the remainder registers comprises five decades of upscale decimal counter units. When a remainder register is full, a borrow or carry signal is provided. These borrow or carry signals are the components of pulses $\overline{UF}$ and $\overline{DF}$ which are applied to the distance counters. These components of pulses $\overline{UF}$ and $\overline{DF}$ produce motion along straight lines of any slope or along circular arcs depending upon their relative rates. When contouring along straight lines is desired, the arc gates block the cross coupling of pulses $\overline{UF}$ and $\overline{DF}$. The remainder registers in the up and down integrators receive and add the numbers from their respective integrand registers in response to each contouring velocity pulse $\overline{CV}$. Each time a remainder register becomes full, it produces a $\overline{UF}$ pulse or a $\overline{DF}$ pulse. The respective rates of these $\overline{UF}$ and $\overline{DF}$ pulses result in a straight line having a slope initially indicated by the numbers in the up and down integrand registers. These components of pulses $\overline{UF}$ and $\overline{DF}$ may also be cross-coupled or supplied to the integrand register of the other integrator through respective arc gates. The arc gates permit these components of pulses $\overline{UF}$ and $\overline{DF}$ to be cross-coupled when a circle signal $\overline{CIR}$ is received from the numerical data input equipment. Under this condition, the components pulses $\overline{DF}$ add (i.e., carry) to the numbers in the up integrand register, but the components of pulses $\overline{UF}$ subtract (i.e., borrow) from the numbers in the down integrand register. This particular operation is produced by a circle signal $\overline{CIR}$. This operation is an interdependent one that causes the numbers in the up integrand register and the frequency of the components of pulses $\overline{UF}$ to increase, and at the same time causes the numbers in the down integrand register and the frequency of the components of pulses $\overline{DF}$ to decrease. These interdependently increasing and decreasing rates of the components of the pulses $\overline{UF}$ and $\overline{DF}$ occur at respective sinusoidal and cosinusoidal rates. These sinusoidal and cosinusoidal rates produce pulses which result in a circular arc or motion.

Two examples of operation of the contouring function generator will be given. In the first example, assume that a six inch straight line is to be provided at an angle of 30 degrees with the X axis. This would require an X distance of 5.1960 inches (6× cosine 30°) and a Y distance of 3.0000 inches (6× sine 30°). These X and Y distances would be respectively placed in the down and up integrand registers, and also in the X and Y distance counters. When contouring begins, contouring velocity pulses $\overline{CV}$ are supplied to the add control circuits. Each time a contouring velocity pulse $\overline{CV}$ appears, the number in each of the respective integrand registers is added to its respective remainder register. When the remainder register in the up integrator reaches a count of 100,000 in its five decades, it produces a $\overline{UF}$ pulse. When the remainder register in the down integrator reaches a count of 100,000 in its five decades, it produces a $\overline{DF}$ pulse. Since the number (namely 5.1960) in the down integrand register is larger than the number (namely 3.0000) in the up integrand register, the remainder register in the down integrator will reach a count of 100,000 more quickly than the remainder register in the up integrator. Thus, $\overline{DF}$ pulses are produced at a higher rate than $\overline{UF}$ pulses, and the relative rates of the pulses so produced have the ratio of 5.1960 to 3.0000. This ratio produces, of course, the straight line having an angle of 30 degrees with the X axis. The distance counters count the $\overline{UF}$ and $\overline{DF}$ pulses, and when the proper number of pulses have been passed, no further pulses are permitted and motion stops.

In the second example, assume that a circular arc having a radius of five inches is to be provided, this arc swinging from a given point in the first quadrant counterclockwise through an angle of 90 degrees. At the beginning of this arc, all of the motion is along the X axis, and as the arc progresses, motion shifts to the Y axis. At an angle of 45 degrees, the motion is equal along the X and Y axes. At the point at which the arc reaches 90 degrees, all of the motion is along the Y axis. Since all of the motion begins along the X axis, the arc radius of five inches is inserted in the down integrand register, and the numerical data input equipment arranges the system so that the $\overline{DF}$ pulses are supplied to the X distance counter and the $\overline{UF}$ pulses are supplied to the Y distance counter. The up integrand register has no number placed in it, and is at zero in all decades. When contouring begins, the circle signal $\overline{CIR}$ opens the arc gates. Since there is no number in the up integrand register, the contouring velocity pulses $\overline{CV}$ have nothing to add in the remainder register of the up integrator. When the remainder register in the down integrator reaches a count of 100,000, a $\overline{DF}$ pulse is produced. This pulse is supplied to the X distance counter and is also passed by the arc gate and carried or added to the up integrand register. When enough $\overline{DF}$ pulses have been produced, the remainder register in the up integrator reaches the count of 100,000 and produces a $\overline{UF}$ pulse. This pulse is supplied to the Y distance counter and is also passed through the arc gate to the down integrand register. However, this pulse borrows or subtracts one count from the down integrand register so that the down integrator produces $\overline{DF}$ pulses at a slightly lower rate. This sequence or operation continues, and $\overline{DF}$ pulses are produced at a decreasing rate and $\overline{UF}$ pulses are produced at an increasing rate. These rates interdependently vary sinusoidally and cosinusoidally, and produce a resultant motion which is along the circular arc having a radius of five inches. When the arc has swung through the desired 90 degrees, the distance counters stop any further pulses, and motion is halted.

The examples given above are relatively simple, but serve to illustrate the operation of the contouring function generator. By proper input information and connections of the $\overline{UF}$ and $\overline{DF}$ pulses, straight lines of any slope and direction may be produced, and circular arcs of any direction, radius, and length may also be produced.

Figure 3:
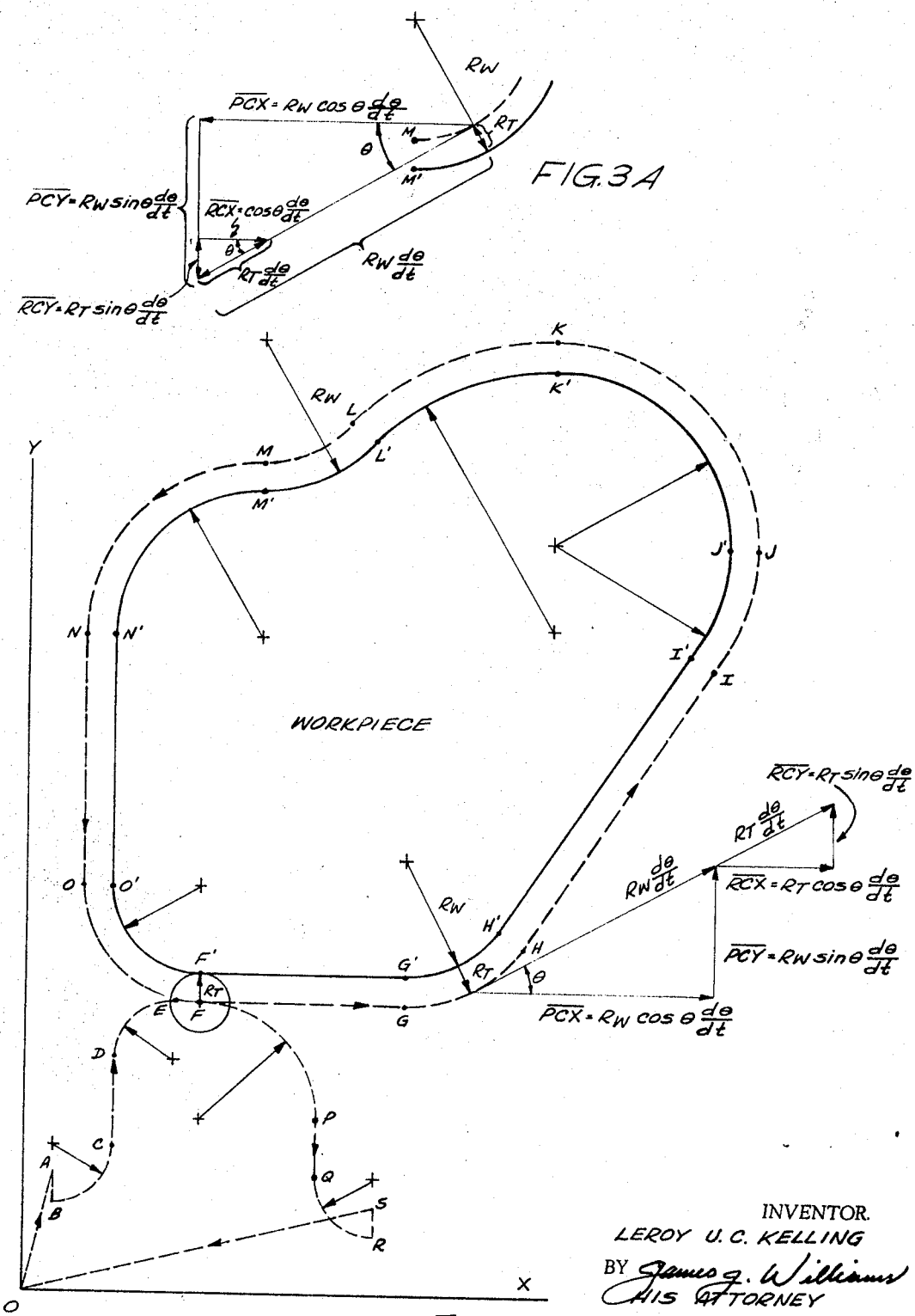
FIGURE 3 shows a workpiece having a contour which might be commanded, the path a cutter which follow in producing the contour, and vector diagrams illustrating the resultant relative motions produced by a numerical contouring control and by the compensating circuit of the invention.

FIGURE 3 shows a workpiece which may be contoured by the contouring control system shown in FIGURES 1 and 2. Significant points on the workpiece are indicated by alphabetical letters followed by a prime. Beginning at the lower left, the workpiece comprises a straight line F'G' parallel to the X axis, a first quadrant counterclockwise arc G'H', a sloping straight line H'I', a first quadrant counterclockwise arc I'J', a second quadrant counterclockwise arc J'K', a third quadrant counterclockwise arc K'L', a reverse (i.e., concave) third quadrant counterclockwise arc L'M', a third quadrant counterclockwise arc M'N', a straight line N'O' parallel to the Y axis, and a fourth quadrant counterclockwise arc O'F'. The vector diagram associated with the arc G'H' shows the resultant pulse rate ($R_W d\theta/dt$) and the component pulse rates ($\overline{PCX}$ and $\overline{PCY}$) at a given instant during the contouring operation along the arc G'H' (as well as along the arc described in the example above). It will be seen from the workpiece shown in FIGURE 3 how proper input information along with the single quadrant of slope or arcuate motion can be used with the contouring function generator to produce straight lines, slopes, and arcuate motion in any direction and in any quadrant.

COMPENSATING CIRCUIT

The compensating circuit of the invention is also shown in the block diagram in FIGURE 1. This compensating circuit comprises an arc gate 30 which permits the contouring velocity pulses $\overline{CV}$ to be applied to a pulse rate divider 31 in response to appropriate circle signals $\overline{CIR}$ applied to the arc gate 30. These contouring velocity pulses $\overline{CV}$ are applied through a pulse rate divider 31 to a tool radius (or compensating) function generator 32. The pulse rate divider 31 may be utilized to reduce the rate of the contouring velocity pulses $\overline{CV}$ by a factor N depending upon the amount of compensation desired. It will be recalled that the contouring function generator 16 has five decades between 1.0000 inch and 0.0001 inch, and that one contouring velocity pulse $\overline{CV}$ produces 0.0001 inch of motion. If compensation up to 9.9999 inches is desired, then there would be no pulse rate division, and the tool radius function generator 32 would need five decades. If compensation up to 0.9999 inch is sufficient, the pulse rate division factor woud be ten, and the tool radius function generator 32 would need four decades. If compensation up to 0.0999 inch is sufficient, the pulse rate division factor would be one hundred, and the tool radius function generator 32 would need three decades. For purposes of illustration, it has been as assumed that compensation up to 0.9999 inch is needed. Hence the compensating or tool radius function generator 32 has four decades. Therefore, the pulse rate divider 31 divides the contouring velocity pulses by ten so that the compensating circuit is capable of handling these pulses. The tool radius function generator 32 operates in response to the numerical data input equipment 10 and to tool radius or compensating input equipment 33. This function generator 32 resolves the divided contouring velocity pulses $\overline{CV}/_N$ into components of pulses for the X and Y axes of motion. These components of pulses are indicated as $\overline{RCY}$ and $\overline{RCX}$, and are supplied to the respective Y and X command phase counters 19, 20. The tool radius input equipment 33 comprises means for indicating the amount of compensation desired. This compensation is measured along a line perpendicular to a commanded straight line, or perpendicular to tangents to an arc at their points of tangency. A few examples will illustrate this. If a commanded program for a contour hase been calculated on the basis of the finished workpiece surface itself, and if the radius of the tool to be used is one-half inch, then a tool radius of plus one-half inch would be set into the tool radius input equipment 33. If a command program for a contour has been calculated on the basis of the tool center path of a tool having some nominal radius, a minus value would be set into the input equipment 33 for undersize (ground down) tools, and a plus value would be set into the input equipment 33 for oversize tools. The minus and plus values would be equal to the difference between the nominal tool radius and the actual tool radius. Normally, the machine tool control operator knows the basis of the commanded program path and knows what tool radius is to be used.

Figure 4:
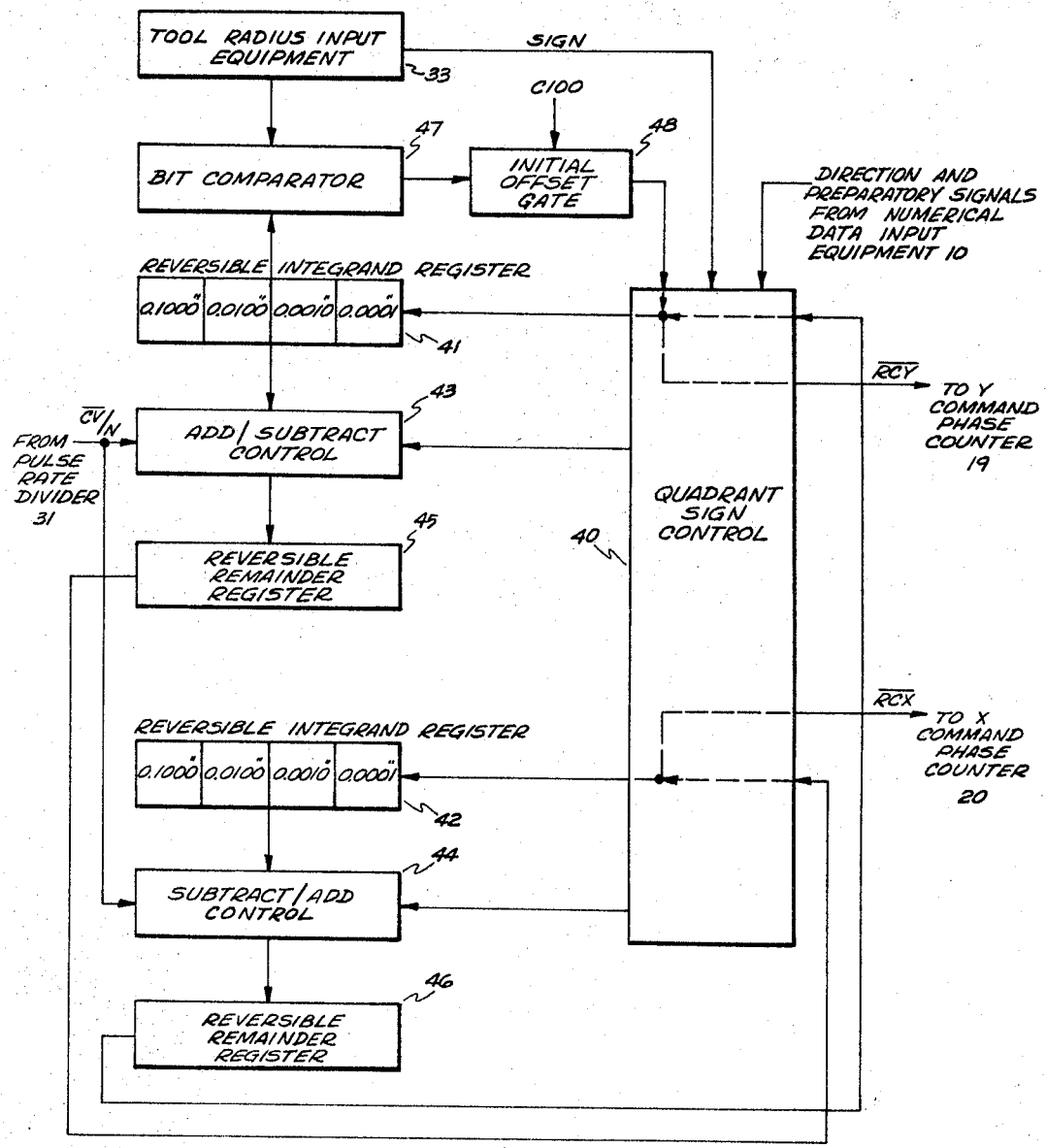
FIGURE 4 shows a more detailed block diagram of a tool radius function generator used in the compensating circuit of the invention.

FIGURE 4 shows a more detailed block diagram of the tool radius function generator used in the compensating circuit of the invention. This tool radius function generator is similar to the contouring function generator, but its integrand registers 41, 42 and its remainder registers 45, 46 are reversible. That is, these registers are capable of counting up or down in accordance with the signals applied to their inputs from a quadrant sign control 40 which contains logic and gating circuits. Numbers placed in the integrand registers 41, 42 are respectively transferred to the remainder registers 45, 46 through add/subtract controls 43, 44. These numbers are added or subtracted in response to the divided contouring velocity pulses $\overline{CV}/_N$ and in accordance with the logic supplied to the controls 43, 44 from the quadrant sign control 40. The integrand registers 41, 42 each have four decades of reversible decimal counters having the significances from 0.1000 inch to 0.0001 inch. The remainder registers 45, 46 each have four decades of reversible decimal counters and put out one carry or borrow overflow for each 10,000 units added into or subtracted from the counter. As the remainder registers 45, 46 respectively reach a count of 10,000, they produce a borrow or carry signal which is supplied to the quadrant sign control 40. The quadrant sign control supplies these signals to the Y and X command phase counters 19, 20 as the components of pulses $\overline{RCY}$ and $\overline{RCX}$. The quadrant sign control 40 also supplies these components of pulses in a cross-coupled fashion so that pulses from a remainder register associated with one integrand register are supplied to the other integrand register. Whether these components of pulses are added or subtracted in the integrand registers 41, 42 depends upon the particular quadrant in which the tool radius function generator is operating.

The desired compensation and sign are placed in the tool radius input equipment 33. The integrand register 41 is connected to a bit comparator 47. The bit comparator 47 is also coupled to the tool radius input equipment 33 and makes a decade-by-decade comparison of the numbers in the input equipment 33 and in the integrand register 51. The bit comparator 47 produces a signal indicative of whether the two compared numbers are equal or different, and the direction of difference. When the tool radius compensation is inserted, the bit comparator 47 opens the initial offset gate 48 to permit pulses from the pulse rate divider 12, at the C100 rate for example, to pass through the offset gate 48 to the quadrant sign control 40, to the integrand register 41, and to the Y command phase counter 19 in the form of components of pulses $\overline{RCY}$. When the number in the integrand register 41 is the same as the number in the tool radius input equipment 33, the bit comparator 47 closes the initial offset gate 48. Thus, the tool radius compensation is placed into the tool radius function generator.

With the tool radius function generator supplied with the desired compensating signal it is then ready to operate with the numerical contouring control. This operation is arranged so that the tool radius function generator and the contouring function generator begin in the same initial condition and function or operate in the same manner or in synchronism. The initial requisite of having both function generators start off in the same condition is provided by appropriate direction and preparatory signals supplied to the quadrant control 40 from the numerical input equipment 10. These signals are passed through the quadrant sign control 40 to the reversible integrand registers 41, 42 and to the add/subtract controls 43, 44 and place these elements in the proper initial condition. Then, subsequent snychronized operation of the tool radius function generator is produced by the rate divided contouring velocity pulses $\overline{CV}/_N$. These same pulses (but undivided) are also supplied to the contouring function generator. Therefore, when the contouring function generator produces a circular function, the tool radius function generator also produces a circular function. These circular functions are on a common radial direction which swings about a common center, and thus assures that the two generators operate in synchronism.

FIGURE 3 also shows vector diagrams illustrative of two conditions of the relative magnitudes of the components of pulses $\overline{PCX}$ and $\overline{PCY}$ from the distance counters 17, 18 and of the components of pulses $\overline{RCX}$ and $\overline{RCY}$ from the tool radius function generator 32. The first condition is that existing on the arc G'H'. Here, the programmed path lies on the workpiece surface, which swings about a radius $R_W$. The compensation is plus for the tool radius $R_T$. At the point indicated on the arc G'H', the programmed contouring pulses have a resultant velocity vector $R_W d\theta/dt$, where $\theta$ is the angle between the resultant direction of travel and one of the axes, in this case the X axis, and $t$ is time. These pulses are resolved as shown into velocity vector components $\overline{PCX}$ and $\overline{PCY}$. Since a plus compensation is needed to move the tool center away from the programmed path (which coincides with the finished workpiece surface) by an amount equal to the tool radius $R_T$, the tool radius or compensating function generator adds an additional resultant velocity vector $R_T d\theta/dt$ which is resolved into the velocity vector components $\overline{RCX}$ and $\overline{RCY}$. The motion resulting from the combined $\overline{PCX}$ and $\overline{RCX}$ pulses and the combined $\overline{PCY}$ and $\overline{RCY}$ pulses causes the tool center to move on a path spaced from the commanded path by the desired amount. The vector diagram shown in the upper part of FIGURE 3 illustrates that on a reserve curve, the tool radius pulses $\overline{RCX}$ and $\overline{RCY}$ are subtracted from, that is, act in the opposite direction relative to, the pulses $\overline{PCX}$ and $\overline{PCY}$.

FIGURE 3 also shows the path which a tool having a radius $R_T$ would follow. This path is indicated by the dashed lines and begins at the origin and follows the letters in alphabetical order. Normally, the tool would be moved from the origin to the point A, then the tool radius compensation would be set in. This would cause the tool to move from point A to point B. Then the tool would move along the arc BC, the straight line CD, the arc DE, and the straight line EF to the point of beginning on the workpiece. At this point, the contouring function generator and the compensating or tool radius function generator would have the same slopes or initial condition, namely for movement along the X axis. Subsequently, the tool center would move along the dashed line FG, and then around the arc GH. The motion around the arc GH would be provided by both function generators swinging at the same rate through the same angle so that the desired compensation is provided. Similar functions would take place through the remainder of the operation back to the point F. At the point F, the tool path would move along the arc FP, the straight line PQ, and the arc QR. At the point R, the tool radius compensation would be removed as indicated by the travel from point R to point S. Then, the tool would be moved back to the origin and the operation would be complete. During straight line motions, neither function generator rotates, the contouring function generator provides a fixed ratio of pulses, and the compensating function generator produces no pulses.

Figure 5:
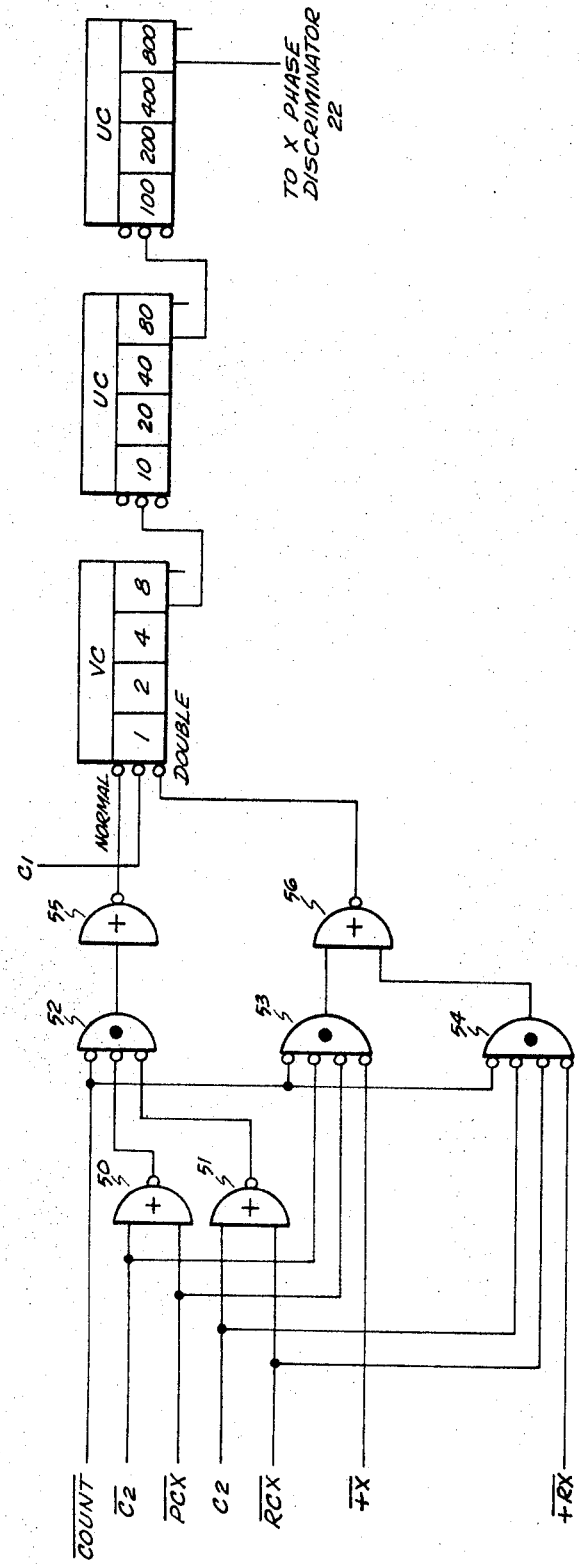
FIGURE 5 shows the logic circuits which can be used to combine the compensating and contouring components of pulses.
Figures 6A, 6B:
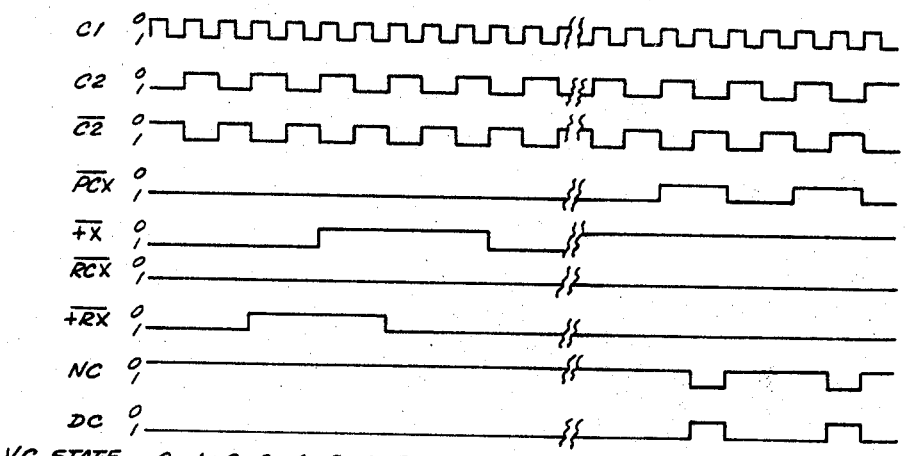
FIGURES 6a to 6i show waveforms which illustrate the combining of the compensating and contouring pulses under various conditions.
Figures 6C, 6D, 6E:
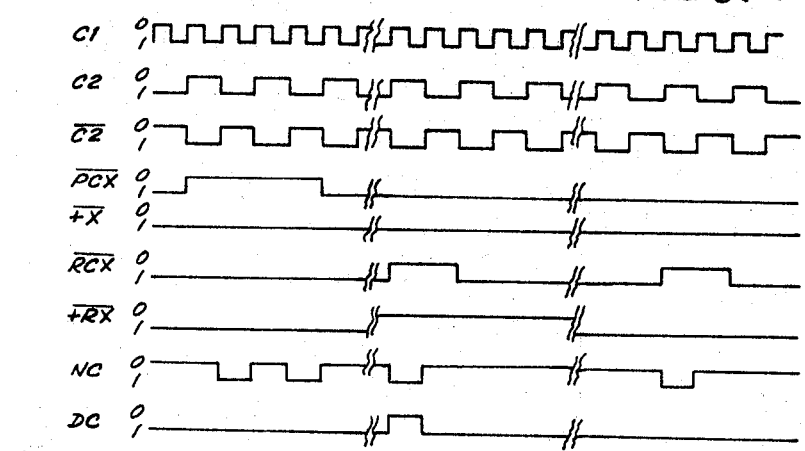
Figures 6F, 6G:
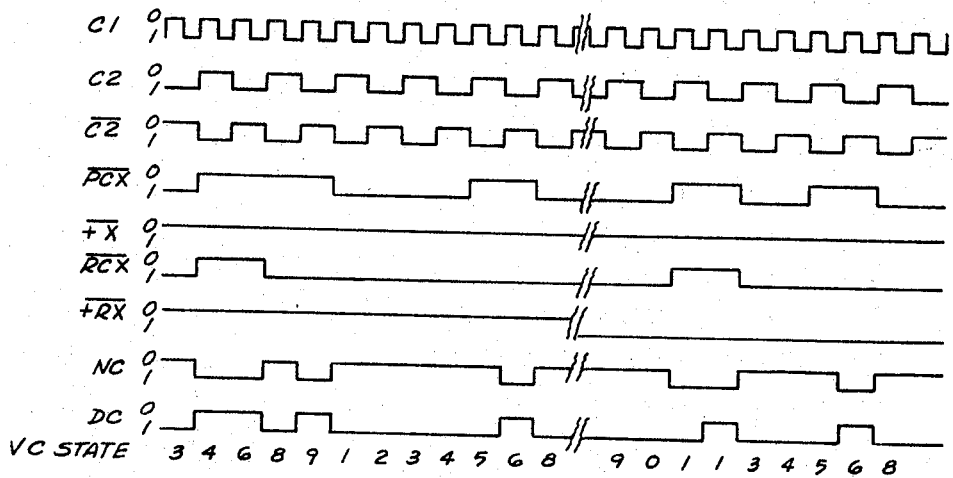
Figures 6H, 6I:
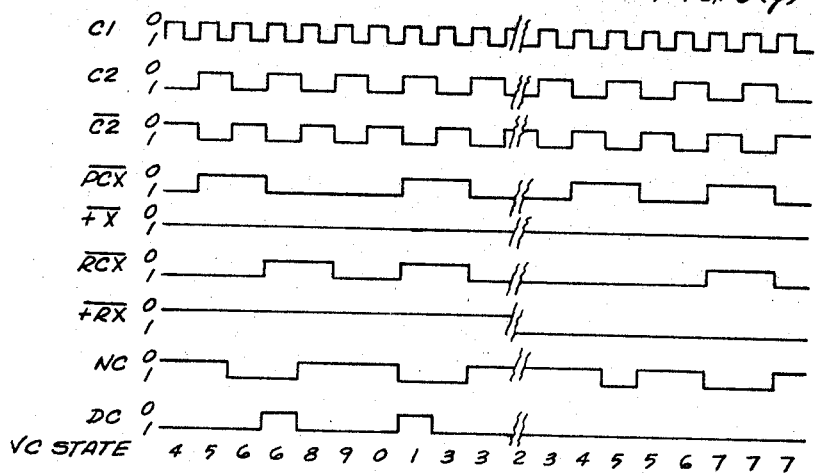

FIGURE 5 shows logic circuits for combining the contouring and compensating components of pulses for the X axis of motion. These combined components of pulses are supplied to the X command phase counter 20. Similar circuits would be provided for the Y command phase counter 19. The command phase counter includes three decades of counters. Each counter has four flip-flops of the indicated numerical significances. Pulses of the C1 rate are continually applied to the least significant decade (units) counter VC which is a variable counter. The output of the variable counter VC is coupled to the input of the tens decade up counter, and the output of the tens decade up counter is coupled to the input of the hundreds decade up counter. Each time 1,000 pulses (at the C1 rate) are counted, the hundreds decade up counter produces a signal which causes a logic transformation that is supplied to the X phase discriminator 22. The time of this logic transformation has phase significance which is compared with the phase of the signal provided by the X resolver 24. This phase comparison is used to produce motion. The variable counter VC counts at a normal rate, at a less than normal rate, or at a higher than normal rate depending upon the signal supplied to the indicated normal and double count inputs. If the normal count input is at a logic 0, the variable counter VC counts normally. If the normal count input is at a logic 1, the variable counter VC counts at a higher or lower rate depending upon the condition of the double count input. If the normal count input is at a logic 1 and the double count input is also at a logic 1, the variable counter VC does not count. However, if the normal count input is at a logic 1 and the double count input is at a logic 0, then the variable counter VC counts at a double rate. The conditions of the normal and double count inputs are determined by the logic circuits connected to these inputs. The logic circuits include a number of NOR gates which may have one, two, three, or four, or more inputs. As known in the art, if a logic 1 is supplied to any input of a NOR gate, the gate produces a logic 0 at its output. If all inputs to a NOR gate are at a logic 0, then the gate produces a logic 1 at its output.

After start up of the control, a $\overline{COUNT}$ signal of logic 0 is continually provided. Contouring motion in an arbitarily designated upscale direction is indicated by a $\overline{+X}$ signal being at a logic 0, and contouring motion in the downscale direction is indicated by the $\overline{+X}$ signal being at a logic 1. This $\overline{+X}$ signal is derived from the numerical data input equipment 10. Similarly, an upscale radius or compensating direction is indicated by the $\overline{+RX}$ signal being at a logic 0, and the downscale radius or compensating direction is indicated by the $\overline{+RX}$ signal being at a logic 1. This $\overline{+RX}$ signal is also derived from the numerical data input equipment 10 and quadrant sign control logic. If either the X axis contouring component of pulses $\overline{PCX}$ or the X axis tool radius or compensating component of pulses $\overline{RCX}$ becomes a logic 0, then motion may take place. This is because one of the gates 50, 51 may produce a logic 1 which causes a logic 1 to be supplied to the normal input. This prevents a normal count, and hence motion results. When one of the $\overline{+X}$ or $\overline{+RX}$ signals is at a logic 0, one of the gates 53, 54 may, depending upon the logic condition of the $\overline{PCX}$ and $\overline{RCX}$ signals, produce a logic 1. This causes a logic 0 to be applied to the double count input and a double count occurs. When both the $\overline{+X}$ and $\overline{+RX}$ signals are at a logic 1, both inputs to the gate 56 are at a logic 0, and a logic 1 is applied to the double input. Thus, a double count cannot occur. If $\overline{PCX}$ and $\overline{RCX}$ are both at a logic 1, and if the count signal is at a logic 0, all inputs to the gate 52 are at a logic 0, and a logic 0 is applied to the normal count input. The variable counter VC counts at a normal rate which is the condition for no motion. This agrees with $\overline{PCX}$ and $\overline{RCX}$, both being at a logic 1. If the $\overline{PCX}$ and $\overline{C2}$ are both at logic 0, or if the $\overline{RCX}$ and C2 are both at logic 0, a logic 1 is applied to the normal count input of the variable counter VC. This condition permits the variable count to not count or to count at a double rate, depending on the condition of the double input.

FIGURE 6 shows waveforms of representative logic conditions in the X axis portion of the system. The waveforms are for the C1 and C2 rate pulses, the contouring component of pulses $\overline{PCX}$, the X axis upscale or downscale direction signal $\overline{+X}$, the compensating component of pulses $\overline{RCX}$, the X axis upscale or downscale compensating direction signal $\overline{+RX}$, the count rate (i.e., normal count N.C. or double count D.C.) of the variable counter VC, and the count condition in the variable counter VC. In the waveform N.C. of normal count, a logic 1 means a normal count cannot occur, and a lost count occurs if a double count does not occur. Also, a logic 0 means a normal count does occur. In the waveform D.C. of double count, a logic 1 means a lost count may occur and a logic 0 means a double count may occur, this depending on the normal count condition and the results of these conditions. FIGURE 6(a) shows a case where downscale and upscale contouring and where downscale and upscale radius compensation directions are selected, but where no $\overline{PCX}$ and $\overline{RCX}$ signals are produced. In this case, a normal count occurs. As pointed out above, a normal count results in no motion because no relative phase shift is produced. FIGURE 6(b) shows where upscale contouring is called for. At two separate times, two double counts are provided so that upscale motion is provided at these times. In FIGURE 6(c), downscale contouring is called for so that a count is lost at two times. In FIGURE 6(d), upscale radius compensation is called for. Under this condition, one double count is provided. In FIGURE 6(e), downscale radius compensation is called for, and one count is lost. In FIGURE 6(f), upscale contouring and upscale radius compensation are called for, and four double counts are provided. In FIGURE 6(g), upscale contouring and downscale radius compensation are called for, and one count is lost and two double counts are provided. In FIGURE 6(h), downscale contouring and upscale radius compensation are called for, and two double counts are provided and two counts are lost. And in FIGURE 6(i), downscale contouring and downscale radius compensation are called for, and three counts are lost.

The logic circuits of FIGURE 5 for the X axis, and similar logic circuits for the Y axis, enable pulses to be combined in any fashion so that proper compensation may be provided for any conditions.

CONCLUSION

The invention provides a new and improved compensating circuit for use with numerical contouring control systems. The compensating circuit enables compensation be made for any programmed path, whether based on the finished workpiece surface or on some nominal tool radius. And, the compensating circuit can function on internal and external surfaces of concave or convex configuration. And finally, the compensating circuit can be used with numerical contouring controls of the digital type and is compatible with these controls so that no analog conversion of one or the other input information signals is necessary. While the invention has been described with reference to a single embodiment, it is to be understood that modifications may be made without departing from the spirit of the invention or from the scope of the claims.

What I claim as new and desire to secure by Letters Patent of the United States is:

1. In a contouring control system for producing relative motion of a tool and workpiece along a path comprising interconnected straight lines and circular arcs, wherein input information means are provided for commanding the speed of said relative motion and the direction of said path, wherein a velocity command is coupled to said input information means for producing contouring velocity pulses having a rate indicative of said speed of relative motion, and wherein a contouring function generator is coupled to said velocity command and to said input information means for resolving said contouring velocity pulses into first and second components of pulses having respective rates which indicate the direction of said commanded path relative to two axes, a compensating circuit for maintaining said tool at a desired distance and direction from said commanded path comprising distance input means for commanding said desired distance and direction; a circular compensating function generator coupled to said velocity command for resolving said contouring velocity pulses into first and second components of pulses having respective rates which indicate said desired distance relative to said two axes; said contouring function generator and said compensating function generator both having a common reference axis parallel to one of said two axes, said contouring function generator and said compensating function generator both changing the rates of their respective components of pulses relative to the angular change between said reference axis and said path; means for setting said contouring function generator and said compensating function generator in initial and similar conditions relative to said reference axis; means coupled to said contouring function generator and to said compensating function generator for combining said first components of pulses to produce first resultant pulses for effecting movement along one of said two axes; and means coupled to said contouring function generator and to said compensating function generator for combining said second components of pulses to produce second resultant pulses for effecting movement along the other of said two axes.

2. In a control system for producing relative motion of a tool and workpiece along a path comprising interconnected straight lines and circular arcs in which input information means are provided for commanding the speed of said relative motion and direction of said path, in which a velocity command is coupled to said input information means for producing velocity pulses having a rate indicative of said speed of relative motion, and in which a main function generator is coupled to said velocity command and to said input information means for resolving said velocity pulses into first and second components of pulses having rates which respectively indicate the direction of said commanded path relative to first and second axes and having rates which change interdependently in response to commanded arcuate paths, a compensating circuit for maintaining said tool at a predetermined distance and direction from said commanded path comprising distance input means for commanding said predetermined distance and direction; a circular compensating function generator coupled to said input information means and coupled through gating means to said velocity command for resolving said velocity pulses passed by said gating means into first and second components of pulses having rates which respectively indicate said predetermined distance relative to said first and second axes and which interdependently vary in response to said velocity pulses; means coupling said gating means to said input informaton means for passing said velocity pulses in response to commanded arcuate paths; means for setting said main function generator and said compensating function generator in initial and similar conditions relative to one of said axes; means coupled to said main function generator and to said compensating function generator for combining said first components of pulses to produce first resultant pulses for effecting movement along said first axis; and means coupled to said main function generator and to said compensating function generator for combining said second components of pulses to produce second resultant pulses for effecting movement along said second axis.

3. In a numerical contouring control system for producing relative motion of a tool and workpiece along a path comprising interconnected straight lines and circular arcs wherein input information means are provided for commanding the speed of said relative motion and the direction of said path, wherein a velocity command is coupled to said input information means for producing contouring velocity pulses having a rate indicative of said speed of relative motion, and wherein a contouring function generator is coupled to said velocity command and to said input information means for resolving said contouring velocity pulses into two components of pulses having respective rates which indicate the direction of said commanded path relative to two mutually perpendicular axes and which interdependently vary sinusoidally and cosinusidally in response to input information indicating an arcuate commanded path, a compensating circuit for maintaining said tool at a predetermined perpendicular distance and direction from a straight line commanded path and from tangents at their points of tangency to an arcuate commanded path comprising distance input means for commanding said predetermined perpendicular distance and direction; a circular compensating function generator coupled to said distance input means and coupled to said velocity command for resolving said contouring velocity pulses into two components of pulses having respective rates which indicate said predetermined perpendicular distance relative to said two mutually perpendicular axes and which interdependently vary sinusoidally and cosinusoidally in response to said contouring velocity pulses; and control means coupling said compensating function generator to said input information means to cause said compensating function generator to have the same initial condition as said contouring function generator and to operate in synchronism with said contouring function generator when said contouring function generator produces said two components of pulses which vary interdependently sinusoidally and cosinusoidally, whereby said contouring function generator and said compensating function generator produce respective first and second components of pulses that have resultants which lie on a common motion radius that swings about a common center.

4. In a numerical contouring control system for producing relative motion of a tool and workpiece along a path comprising interconnected straight lines and circular arcs which are substantially tangent at the points of connection of straight lines and arcs and at the points of connection of arcs of different characteristics, wherein input information means are provided for commanding the speed of said relative motion and the straight line and arcuate directions of said path, wherein a velocity command is coupled to said input information means for producing the contouring velocity pulses having a rate indicative of said speed of relative motion, and wherein a contouring function generator is coupled to said velocity command and to said input information means for resolving said contouring velocity pulses into first and second components of pulses having respective rates to two mutually perpendicular axes, said components of pulses providing resultant motion along said commanded path and interdependently varying in response to arcuate input information and providing resultant arcuate motion along a circular commanded path, a compensating circuit for maintaining a predetermined point of said tool at a substantially predetermined perpendicular distance and a relative direction from each straight line of said commanded path and from tangents at their points of tangency to arcs of said commanded path comprising the distance input means for commanding said predetermined perpendicular distance and relative direction; a reversible counting circular function generator coupled to said distance input means and coupled through gating means to said velocity command for resolving said contouring velocity pulses into first and second components of pulses having respective rates relative to said two mutually perpendicular axes, said components of pulses providing resultant motion along said predetermined perpendicular distance and interdependently varying in response to said contouring velocity pulses; control means coupling said circular function generator to said input information means to cause said circular function generator to operate in synchronism with said contouring function generator when said contouring function generator produces said first and second components of pulses for arcuate motion, whereby said contouring function generator and said circular function generator produces respective first and second components of pulses that have resultants which swing about a common center; means coupled to said contouring function generator and to said circular function generator for combining said first components of pulses to produce first resultant pulses for effecting movement along one of said two perpendicular axes; and means coupled to said contouring function generator and to said circular function generator for combining said second components of pulses to produce second resultant pulses for effecting movement along the other of said two perpendicular axes.

5. In a numerical contouring control system for producing relative motion of a tool and workpiece along two mutually perpendicular axes which lie in a plane to provide a resultant path of motion comprising interconnected straight lines and circular arcs which have a common tangent at their points of connection, said control system having input information means for commanding the speed of all said resultant path motion and the direction of said resultant path motion, a velocity command coupled to said input information means for producing contouring velocity pulses having a rate indicative of said speed of resultant path motion, and a contouring function generator coupled to said velocity command and to said input information means for resolving said contouring velocity pulses into sine and cosine components of pulses having respective rates which indicate the direction of said resultant path motion relative to said two axes, said sine and cosine components of pulses having a relative rate that is fixed in response to input information indicating straight line resultant path motions and having a relative rate that varies sinusoidally and cosinusoidally in response to input information indicating circular resultant path motions, a compensating circuit for maintaining said tool at a predetermined distance and relative direction from said commanded path comprising distance input means for commanding said predetermined perpendicular distance and relative direction; a compensating function generator coupled to said distance input means and coupled through gating means to said velocity command for resolving gated contouring velocity pulses into sine and cosine components of pulses having respective rates which indicate said predetermined distance relative to said two axes, said sine and cosine components of pulses having a relative rate that varies sinusoidally and cosinusoidally in response to said gated contouring velocity pulses; said contouring function generator and said compensating function generator both sinusoidally and cosinusoidally changing, from an initial condition, the rates of their respective sinusoidally and cosinusoidally varying components of pulses in synchronism and in response to input information indicating circular resultant path motions, means coupled to said contouring function generator and to said compensating function generator for combining said sine components of pulses to produce first resultant pulses for effecting movement along one of said two perpendicular axes; and means coupled to said contouring function generator and to said compensating function generator for combining said cosine components of pulses to produce second resultant pulses for effecting movement along the other of said two perpendicular axes.

6. In a numerical contouring control system for producing relative motion of a tool and workpiece along a commanded path comprising interconnected straight lines and circular arcs which are substantially tangent to each other at their points of connection, a compensating circuit for maintaining said tool at a predetermined distance and direction from said commanded path comprising distance input means for commanding said predetermined perpendicular distance and direction; a circular compensating function generator coupled to said distance input means and coupled to said contouring control system for receiving control system signals only in response to said control system commanding an arcuate path, said compensating function generator resolving said control system signals into two components of pulse signals having respective rates which indicate said predetermined distance with respect to two mutually perpendicular axes and which interdependently vary sinusoidally and cosinusoidally as said control system signals are received; and means coupled to said contouring function generator and to said control system for combining said components of pulse signals with said control system signals to produce resultant signals which effect said relative motion compensated by said predetermined distance and direction.

7. A numerical contouring control system for producing relative motion of a tool and workpiece along a path of straight lines and circular arcs which are substantially tangent at their points of connection, comprising input information means for commanding said path; a velocity command coupled to said input information means for producing contouring velocity pulses having a rate indicative of the speed of said relative motion; a contouring function generator coupled to said velocity command and to said input information means for resolving said contouring velocity pulses into two components of pulses having respective rates which indicate the direction of said commanded path with respect to two mutually prependicular axes and which interdependently vary sinusoidally and cosinusoidally in response to input information indicating an arcuate commanded path; a compensating circuit coupled to said control system for maintaining said tool at a predetermined distance and direction from said commanded path, said compensating circuit comprising compensating input means for commanding said distance and direction; a circular compensating function generator coupled to said compensating input means and coupled through gating means to said velocity command for resolving said contouring velocity pulses into two components of pulses having respective rates which indicate said predetermined distance with respect to said two mutually perpendicular axes and which interdependently vary sinusoidally and cosinusoidally in response to said contouring velocity pulses; means coupling said gating means to said input information means for applying said contouring velocity pulses to said compensating function generator in response to said input information indicating an arcuate commanded path; control means coupling said compensating function generator to said input information means to cause said compensating function generator to operate in synchronism with said contouring function generator in response to said input information means indicating an arcuate commanded path, whereby said contouring function generator and said compensating function generator produce respective first and second components of pulses that have resultants which are effective at a common radius that swings about a common center; means coupled to said contouring function generator and to said compensating function generator for combining said sinusoidal components of pulses to produce first resultant pulses for effecting movement along one of said two perpendicular axes; and means coupled to said contouring function generator and to said compensating function generator for combining said cosinusoidal components of pulses to produce second resultant pulses for effecting movement along the other of said two perpendicular axes.

8. In an automatic system for controlling a machine, first means for actuating an analogue servomechanism controlling the operation of said machine, a source of a predetermined program comprising a series of individual commands, each of said commands containing information digitally encoded in a plurality of discrete electrical signals, second means for sequentially applying said electrical signals to said first means, means to produce in a predetermined time interval a first train of pulses consisting of a number of pulses determined by the information in said commands, a source of common clock pulses, first and second countdown circuits responsive to pulses from said clock pulse source to produce first and second output signals respectively, means to apply said first train of pulses to one of said countdown circuits to phase shift its output signal relative to said second output signal to a degree proportional to the number of pulses in said train, a source of compensation information pulses, said one countdown circuit responsive to said compensation pulses to modify the phase shift of its output signal by said first train of pulses, means to apply said modified phase shift first output signals and said second output signals to said servomechanism, said analogue servomechanism being responsive to the phase difference between said applied first and second output signals to actuate said machine to an extent determined by the information in said program and said compensation pulses.

9. In an automatic system for controlling a machine, first means for actuating an analogue servomechanism controlling the operation of said machine, a source of a predetermined program comprising a series of commands, second means for sequentially applying said commands to said first means, means to produce in a predetermined time interval a first train of pulses consisting of a number of pulses determined by the information in said commands, a source of master signals, first and second countdown circuits responsive to signals from said master signal source to produce first and second output signals respectively, means to apply said first train of pulses to one of said countdown circuits to phase shift its output signal relative to said second output signal to a degree proportional to the number of pulses in said train, a source of control pulses, said one countdown circuit responsive to said control pulses to modify the phase shift of its output signal by said first train of pulses, means to apply said modified phase shift first output signals and said second output signals to said servomechanism, said analogue servomechanism being responsive to the phase difference between said applied first and second output signals to actuate said machine to an extent determined by the information in said program and said control pulses.

10. An arrangement for controlling the relative positioning of a first object and a second object comprising, means for generating recurring master pulses, a reference frequency counter connected to receive said master pulses and having means for continuously producing a recurring reference waveform of a given submultiple of the frequency of said master pulses, a control frequency counter responsive to said master pulses for normally producing a recurring control waveform having a given phase relationship with respect to said reference waveform, a source of command positioning pulses, said control counter responsive to said command pulses to shift the phase of said control waveform away from said given phase relationship with respect to said reference waveform, phase comparison means responsive to said reference and phase shifted control waveform to adjust the relative positioning of said first and second objects, and means for further shifting the phase of said control waveform comprising a source of pulses whose number varies with time as a function of the commanded instantaneous relative positions of said first and second objects, said control divider responsive to the pulses from said last named source to further shift the phase of said control waveform relative to said reference waveform.

11. An arrangement for controlling the relative positioning of a first object and a second object comprising, means for generating regularly recurring master signals, a reference frequency dividing counter connected to receive said master signals and having means for continuously producing a recurring reference waveform of a given sub-multiple of the frequency of said master signal, a control frequency dividing counter connected to receive said master signals and having means responsive to said master signals for normally producing a recurring control waveform of the same frequency and constant phase relative to said reference waveform, a source of command positioning signals defining the relative positioning of said first and second objects, means responsive to said command signals for modifying the action of said control counter to change the count which would otherwise be registered by said counter, thereby to shift the phase of said control waveform relative to said reference waveform, phase comparison means connected to receive said reference and control waveforms to adjust the relative positioning of said first and second objects, and means for further modifying the count which would otherwise be registered by said control counter comprising a source of pulses whose number varies as the rate of change of slope of the path defining the relative positioning of said first and second objects, said control counter responsive to the pulses from said last-named source to change the count which would otherwise be registered by said counter, thereby to shift the phase of said control waveform relative to said reference wave.

12. In combination, a machine tool, means for operating said tool in a machining operation, means for creating relative feed movement between said tool and a workpiece, control means responsive to a first signal for adjusting the magnitude and rate of relative movement of said tool and workpiece for normal operation with a particular tool, modifying means normally deenergized from said control means but adapted to be energized to add or subtract increments of movement to or from said first mentioned distance, and means responsive to a second signal to energize said modifying means.

13. In a machine tool control system, a pair of relatively movable members, a pair of separate power driven adjustable speed transmission mechanisms respectively operable to move said members over commanded distances at predetermined speed rates for performing a machining operation, control means normally deenergized during a normal machining operation but actuated by a predetermined signal, a distance modifying means deenergized and separate from said adjustable speed transmission, but energized in response to actuation of said control means for adding or subtracting distance increments of distance to the commanded distances of at least one of said adjustable speed transmission mechanism.

14. In a machine tool having a relatively movable machining tool and a cooperative workpiece, first means to provide relative movement between said tool and said workpiece to effect a machining operation on said workpiece, a program control system including a control tape operative to selectively preset said first means to perform a machining operation over commanded distances, a distance modifying apparatus selectively operative when actuated to modify the relative distance between said workpiece and said tool a predetermined amount irrespective of the preset adjustment of said first means in response to said program control system, a controller operative in responsive to a first signal from said program control system to actuate said distance modifying apparatus for modifying the relative movement of said tool and workpiece by adding or subtracting distance increments, and means responsive to a second signal from said program control system for de-actuating said distance modifying apparatus in a manner that said adjustable speed transmission for said work support is operative to provide the commanded distances preset by said rate control system.

15. An arrangement for controlling the relative positioning of a first object and a second object comprising a source of first positioning signals having a characteristic representing commanded increments of distance, a source of second positioning signals having a characteristic representing further commanded increments of distance, means for generating a third signal having a constant periodicity, means for generating a fourth signal having a periodicity which varies with respect to said constant periodicity as an algebraic function of said first and second signals, and means responsive to the relative variations in periodicity of said third and fourth signals to control the relative positioning of said two objects.

16. In a control system, a pair of relatively movable objects, a pair of separate power driven adjustable speed transmission mechanisms respectively operable to move said members over predetermined distances for performing a given operation, a source of first positioning signals having a characteristic representing commanded increments of distance, a source of second positioning signals having a characteristic representing further commanded increments of distance, means for generating a third signal having a given periodicity, means for generating a fourth signal having a periodicity such that its phase varies with respect to the phase of said third signal as an algebraic function of said first and second positioning signals, and means responsive to the relative phase of said third and fourth signals to adjust the speeds of said transmission mechanisms.

17. A control for a pair of relatively movable objects comprising means to adjust the relative positions of said objects, a source of a first positioning signal having a characteristic representing commanded increments of distance, a source of second positioning signals having a characteristic representing further commanded increments of distance, a source of clock pulses having a given periodicity, a reference counter, a command counter, said reference counter responsive to said clock pulses for producing a reference signal, said command counter responsive to said clock pulses for producing command signals, said command counter responsive to said first positioning signals to modify the phase of said command signal with respect to the phase of said reference signal, said command counter responsive to said second positioning signal for further modifying the phase of said command signal with respect to said reference signal, and means responsive to the aggregate relative phase of said reference and command signals for adjusting the relative positions of said objects.

18. An arrangement for controlling the relative positioning of a tool and a workpiece comprising, a first source of signals having a characteristic representing first commanded increments of distance, a second source of signals having a characteristic representing second commanded increments of distance, a source of recurrent reference signals, a source of recurrent command signals having a predetermined phase relationship with respect to said reference signals, means for changing the phase of said command signal with respect to said reference signal as an algebraic function of said first and second source signals, and means responsive to the aggregate relative phase of said command and reference signals to control the relative positioning of said objects.

19. An arrangement for controlling the relative positioning of a first object and a second object comprising a first source of signals having a characteristic representing first commanded increments of distance, a second source of signals having a characteristic representing second commanded increments of distance, control means selectively responsive to said first source of signals to control the relative positioning of said objects only in accordance with said first commanded increments of distance, said control means selectively responsive to an algebraic function of said first and second sources of signals to control the relative positioning of said objects in accordance with both said first and second commanded increments of distance.

20. An arrangement for controlling the relative positioning of a tool and a workpiece comprising a source of reference signals having a given frequency, a source of command signals having a given frequency and phase with respect to the reference signals, a first function generator producing first and second coordinate pulses describing the workpiece surface to be generated in terms of pulse recurrence rate and accumulated number of pulses, a second function generator producing first and second coordinate pulses describing the offset of the center of the tool to be used in generating the workpiece surface in terms of the relative time of occurrence of the recurrent pulses and their rate of recurrence, said command signal source responsive to an algebraic function of said first function generator and second function generator pulses to vary the relative phase of said reference and command signals, and means for controlling the relative positioning of said two objects in accordance with the relative phase of said reference and command signals.

21. An arrangement for controlling the relative positioning of a first object and a second object comprising a first function generator providing signals describing a first coordinate velocity pattern, a second function generator providing signals describing a second coordinate velocity pattern, a source of reference signals of given periodicity, a source of command signals of a periodicity such that they have a given phase with respect to said reference signals, means for modifying the relative phase of said reference and command signals in accordance with an algebraic function of said first function generator and second function generator signals, means responsive to the modification in the relative phase of said reference and command signals to control the relative positioning of said objects.

22. An arrangement for controlling the relative positioning of a first object and a second object comprising a first function generator generating signals describing a relative path of movement by said objects in terms of a first coordinate velocity pattern, a second function generator generating signals describing a modification of said relative path of movement in terms of a second coordinate velocity pattern, means for controlling the relative positioning of said first and second object as the algebraic sum of said first and second function generator signals comprising a first signal waveform, a second signal waveform, means for varying the relative phase of said first and second signal waveforms in accordance with an algebraic function of said first and second function generator signals, and means responsive to the relative phase of said first and second signals to control the relative positioning of said two objects.

References Cited

UNITED STATES PATENTS

| | | | |
|---|---|---|---|
| 2,829,323 | 4/1958 | Steele | 235—152 XR |
| 3,015,806 | 1/1962 | Wang et al. | 340—147 |
| 3,022,949 | 2/1962 | Steele | 235—152 |
| 3,063,047 | 11/1962 | Steele | 343—7 |
| 3,109,974 | 11/1963 | Hallmark | 318—163 |
| 3,204,132 | 8/1965 | Benaglio et al. | 307—149 |
| 3,246,129 | 4/1966 | McKelvie | 235—151 |
| 3,270,186 | 8/1966 | Centner | 235—151.11 |

MARTIN P. HARTMAN, *Primary Examiner.*

U.S. Cl. X.R.

318—18

UNITED STATES PATENT OFFICE
CERTIFICATE OF CORRECTION

Patent No. 3,449,554                            June 10, 1969

Leroy U. C. Kelling

It is certified that error appears in the above identified patent and that said Letters Patent are hereby corrected as shown below:

Column 2, line 68, after "which" insert -- would --. Column 5, line 20, after "components" insert -- of --. Column 7, line 13, after "been" cancel "as"; line 32, "hase" should read -- has --; line 36, "command" should read -- commanded --. Column 10, line 36, after "to the" insert -- gate 52, and a logic 1 is applied to the --. Column 11, line 16, before "be" insert -- to --. Column 13, line 13, after "producing" cancel "the"; line 28, after "comprising" cancel "the"; line 46, "produces" should read -- produce --; line 64, after "of" cancel "all". Column 17 line 10, "mechanism" should read -- mechanisms --.

Signed and sealed this 30th day of March 1971.

(SEAL)
Attest:

EDWARD M. FLETCHER, JR.                      WILLIAM E. SCHUYLER, JR
Attesting Officer                               Commissioner of Patents